UNITED STATES PATENT OFFICE 2,511,028

4-[(PARA-AMINOPHENYL)ALKYL]CYCLO-HEXYLAMINE

Gerald M. Whitman, New Castle, Del., assignor to E. I. du Pont de Nemours & Company, Wilmington, Del., a corporation of Delaware No Drawing. Application December 4, 1947, Serial No. 789,761

2 Claims. (Cl. 260—563)

This invention relates to new compositions of matter and more particularly to new aromatic amino compounds.

This invention has as an object a class of aromatic amino compounds, and more specifically new [(aminophenyl) alkyl] cyclohexylamines. Further objects reside in methods for obtaining these compounds. Other objects will appear hereinafter.

These objects are accomplished through the production of the above mentioned cyclohexylamines by selective hydrogenation of one of the aromatic rings in a diaromatic diamine of the general formula:

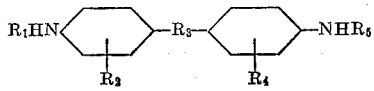

wherein $R_1$ and $R_5$ are of the group consisting of hydrogen atoms and alkyl radicals, $R_2$ and $R_4$ are of the group consisting of hydrogen atoms and alkyl and alkoxy radicals attached to a carbon in the aromatic ring, and $R_3$ is a saturated divalent acyclic hydrocarbon radical.

In the best method for carrying out the invention, a pressure reactor is charged with the diaromatic diamine and a ruthenium hydrogenation catalyst. The reactor is then pressured with hydrogen to a pressure in excess of 1000 lbs./sq. in. and heated to between 80° and 275° C. After an amount of hydrogen has been absorbed corresponding to about 50% of the theoretical required to saturate completely the two aromatic nuclei, the reaction is stopped, the contents discharged, the catalyst is removed, and the desired [(aminophenyl)alkyl] cyclohexylamine separated by conventional means.

The reaction can be carried out as a batch operation or as a continuous or semi-continuous process.

Because of their structural configuration, the [(aminophenyl)alkyl] cyclohexylamines of this invention can exist either in the cis or trans isomeric forms. Hydrogenation of the corresponding diaromatic diamines leads to the formation of a mixture of the two isomers.

Suitable ruthenium catalysts for use in the hydrogenation of the diaromatic diamines to produce the [(aminophenyl)alkyl] cyclohexylamines of this invention are elementary ruthenium, ruthenium oxides, e. g., ruthenium sesquioxide, dioxide and trioxide, perruthenites, e. g., barium perruthenite, ruthenates, e. g., potassium, sodium, silver, barium, calcium, and magnesium ruthenates, perruthenates, e. g., potassium and sodium perruthenates, ruthenium halides, e. g., ruthenium pentafluoride, ruthenium dichloride, trichloride and tetrachloride, ruthenium chlorosalts, potassium chloroperruthenate, ruthenium sulfides, e. g., ruthenium disulfide and trisulfide, ruthenium sulfate, and the like.

Optimum results are obtained when the ruthenium catalyst is in finely divided form. When it is desired to use low catalyst concentrations it is advisable to employ the catalyst supported on a carrier, e. g., charcoal, silica, kieselguhr, alumina, and the like. Such supported catalysts can be prepared by the method disclosed in U. S. Patent 2,079,404, or by other methods involving reduction of a compound of ruthenium in the presence of a carrier substance.

The amount of ruthenium catalyst used may vary within the range of 0.002 to 10% by weight of the diaromatic diamine being reduced. The exact percentage employed, however, depends upon the particular compound undergoing reduction and on the conditions of hydrogenation. As a rule the amount of catalyst employed will vary from 0.1 to 2.0%.

In general the catalytic hydrogenation is effected at a temperature within the range of 80° to 275° C. Satisfactory rates of reaction, with amounts of catalysts within the limits indicated above as preferred, are obtained within the range of 100° to 150° C. and this is therefore the range within which the process is most generally operated.

The hydrogenation is effected at pressures above atmospheric. Generally pressures in excess of 1000 lbs./sq. in. are used and preferably 1500 lbs./sq. in. to 20,000 lbs./sq. in. or more. The upper pressure limit is determined only by the structural limitations of the equipment employed in effecting the hydrogenation. From the standpoint of equipment requirements and reaction rates at temperatures within the range previously specified as preferred the pressures most commonly used will be from 1500 to 3000 lbs./sq. in.

The hydrogenation is effected while the diaromatic diamine is in a fluid condition, i. e., the diamine itself is a liquid or is in the form of a solution in an organic solvent. Suitable organic solvents are alcohols such as methyl, ethyl, propyl, and the like, hydrocarbons such as cyclohexane, methyl cyclohexane, and the like, gasolines and other saturated aliphatic hydrocarbons, ethers such as dioxane, diethyl ether, and the like, etc.

In the second column of table below are listed [(aminophenyl) alkyl] cyclohexylamines produced upon hydrogenation of the diaromatic diamines enumerated in the first column.

| Diaromatic Diamine | [(Aminophenyl)alkyl] Cyclohexylamine |
|---|---|
| Bis(4-aminophenyl)methane | 4[(para-aminophenyl)methyl]cyclohexylamine |
| 1,2-Bis(4-aminophenyl)ethane | 4[1,2(para-aminophenyl)ethyl]cyclohexylamine |
| 1,10-Bis(4-aminotolyl)decane | 4[1,10(para-amino methylphenyl)decyl] methylcyclohexylamine |
| 1,10-Bis(4-aminoethylphenyl)decane | 4[1,10(para-amino ethylphenyl)decyl] ethylcyclohexylamine |
| Bis(para-amino methoxyphenyl)methane | 4[(para-amino methoxyphenyl)methyl]methoxycylcohexylamine |

Diaromatic diamines of the formula previously given, in which $R_3$ is $(CH_2)_n$ where $n$ is an integer of from 1 to 12, are preferred. Other diaromatic diamines of this kind which may be hydrogenated to the [(aminophenyl)alkyl] cyclohexylamines of this invention are 1,4-bis(para-aminophenyl)-2,2,3,3-tetramethylbutane, para, para'-diaminoditolylmethane, para, para'-diaminodiphenetylmethane, para, para'-diaminodianisylmethane, N,N' - dimethyl(diaminodiphenyl)ethane, N,N' - diethyl(diaminodiphenyl)methane, N,N' - di - hexyl(diaminodiphenyl)butane, para, para'-diaminodiphenyldimethylmethane, para, para' - diaminodiphenylmethylmethane, and the like.

The examples which follow further illustrate this invention. Parts are by weight, unless otherwise stated.

*Example I*

Four hundred parts of bis(4-aminophenyl)-methane was hydrogenated to 4-(p - amino - benzyl) cyclohexylamine in four equal portions in the following manner: One hundred parts of bis(4-aminophenyl)methane, 104 parts of purified dioxane, and 3 parts of ruthenium dioxide catalyst were charged into a pressure vessel adapted for agitation by shaking, the reactor was purged with hydrogen, heated to 100° C., and pressured to 1500-3000 lbs./sq. in. with hydrogen gas. After agitation for 1 to 1.5 hours under these conditions, the reactor was cooled, the contents discharged, the catalyst removed by filtration with the aid of activated carbon, and the following products isolated by distillation of the combined reaction mixture. The products obtained were as follows:

*Fraction 1.*—Bis(4-aminocyclohexyl)methane; 66 parts; B. P. 131° C./1 mm.–132° C./0.6 mm.; $n_D^{25}$, 1.5059; neutral equivalent (hydrochloric acid, Methyl Red indicator), 105.5 (calc., 105.2).

*Fraction 2.*—Mixture of bis(4-aminocyclohexyl)methane and 4(p-aminobenzyl) cyclohexylamine; 16.8 parts; B. P. 132° C./0.6 mm.–150° C./0.7 mm.; $n_D^{25}$, 1.5362; neutral equivalent (hydrochloric acid, Methyl Red indicator), 132.4.

*Fraction 3.*—4(p-aminobenzyl) cyclohexylamine; 228.8 parts; B. P. 150° C./0.7 mm.–162° C./0.8 mm.; M. P. 72.5–92.5° C.; neutral equivalent (hydrochloric acid, Methyl Red indicator), 197.2.

The remainder of the product consisted of unchanged bis(4-aminophenyl) methane.

*Example II*

Twelve hundred fifty parts of bis(4-aminophenyl)methane, 3230 parts of purified dioxane, and 9.1 parts of a catalyst consisting of carbon impregnated with sodium ruthenate (corresponding to 0.63 part of ruthenium dioxide) were charged into a one-gallon autoclave equipped with a stirring device. After purging with hydrogen several times, the contents of the autoclave were heated to 200 to 215° C. and subjected to a pressure of hydrogen of 2500 to 3200 lbs./sq. in. for a period of 7.5 hours with stirring. No further hydrogen absorption was observed after the first 6 hours. The autoclave was cooled, the contents discharged, the catalyst filtered off with the aid of activated carbon, and the products isolated by distillation to yield:

*Fraction 1.*—Bis(4-aminocyclohexyl) methane; 774 parts; B. P. 115.3° C./3 mm.–120° C./4 mm.; $n_D^{25.8}$, 1.5052; neutral equivalent (hydrochloric acid using Methyl Red indicator), 105.7.

*Fraction 2.*—4(p-aminobenzyl) cyclohexylamine; 234 parts; B. P. 140.8° C./0.9 mm.–162° C./1.1 mm.; neutral equivalent (hydrochloric acid using Methyl Red indicator), 204.9 (calculated 204.3).

The [(aminophenyl)alkyl] cyclohexylamines of this invention are useful in the manufacture of intermediates for the synthesis of dyestuffs since the aromatic amino group may be diazotized (following blocking of the aliphatic amino group, as by acylation) and the diazo derivative then coupled with a phenol, e. g., alpha-naphthol. The diazotization and coupling of bis(4-aminobenzyl) cyclohexylamine, prepared as described above, are illustrated below:

Seventy five parts of the isomer mixture of bis(4-aminobenzyl) cyclohexylamine (0.368 mole) were refluxed for 4 hours in 24.4 parts (0.41 mole) of methyl formate and 35.5 parts ethanol. The temperature of the boiling liquid rose from 68° C. to 77° C., where it remained constant for 1 hour. Most of the excess solvent was removed under vacuum to give a thick syrup which slowly solidified on standing. Two thirds (0.25 mole) of the N-(4-(p-aminobenzyl) cyclohexyl) formamide thus obtained was mixed with 200 parts of ice in a one liter, 3-necked flask fitted with a stirrer, thermometer, and dropping funnel. The flask was cooled in an ice-salt bath and stirred, while a solution of 72 parts of concentrated HCl (0.729 mole) in 75 parts of water was added drop-wise maintaining the temperature at −8° to +6° C. To the milky suspension of hydrochloride thus formed there was added a solution of 17.3 parts (0.258 mole) of sodium nitrite in 35 parts of water. Addition was carried out under the surface and the temperature was kept at 0° to 5° C. The solution was kept cool in ice and added dropwise, under the surface, to a stirred mixture of 35 parts (0.246 mole) of a solution of alpha-naphthol in 10% sodium hydroxide (17.8 parts (0.45 mole) of sodium hydroxide in 166 parts of water) and 180 parts of ice. Throughout the addition the temperature was kept at 0° to 3° C. by cooling in an ice-salt bath. After standing for 20 hours the thick suspension which formed was filtered, the product on the filter was washed with water, transferred to a vacuum desiccator and dried, yielding a porous, brick-red solid. The weight of product was 84 parts, which corresponds to an 88.5% yield.

The mixture of cis and trans isomers of 4-(p-aminobenzyl) cyclohexylamine, prepared as described previously, reacts with aldehydes to form Schiff bases which are adaptable to further chemical transformations. The preparation of such bases is described below:

Seventy six and five tenths parts of the cis and trans isomers of 4-(p-aminobenzyl)cyclohexylamine (0.375 mole) in 80.8 parts of ethanol was added drop-wise with stirring to 97.6 parts (0.8 mole) of salicylaldehyde in 646.4 parts of ethanol. After addition was complete the thick suspension of yellow crystals which formed was heated for 0.5 hour with stirring on a steam bath. The suspension was allowed to stand overnight, filtered, and washed on the filter with ethanol. After drying in vacuum the product was weighed. The yield was 148 parts which corresponds to a 96% yield. The product melted at 127° to 128° C. and analyzed 8.25, 8.12% nitrogen.

From the mixture of cis and trans isomers, obtained in the hydrogenation of bis(4-aminophenyl)methane as described above, there may be separated the pure trans isomer by a procedure such as described below:

Five hundred and five parts of a mixture of the cis and trans isomers of 4-(p-aminobenzyl)cyclohexylamine, melting at 85–111° C., was dissolved in 610 parts of hot benzene under an atmosphere of nitrogen, 76 parts of petroleum ether (B. P. 30–75° C.) was added to the hot solution, the mixture allowed to crystallize under an atmosphere of nitrogen, the crystals filtered off by suction and washed with a cold mixture of 88 parts of benzene and 20 parts of petroleum ether to yield 395 parts (78.3% yield) of crude trans-4-(p-aminobenzyl)cyclohexylamine melting at 95–117° C. After six additional recrystallizations from hot benzene/petroleum ether in an atmosphere of nitrogen, there was obtained 277.5 parts (55% yield) of almost colorless trans-4-(p-aminobenzyl)cyclohexylamine melting at 121.6–122.4° C. On distillation in vacuo, there was obtained 263.3 parts of diamine in the form of a white, crystalline solid; B. P. 173–176° C./0.8–1.2 mm. The diamine was further purified by a final recrystallization from benzene/petroleum ether under nitrogen to yield 222.8 parts of colorless product melting at 121.3–122.2° C.

Anal. Calcd. for $C_{13}H_{20}N_2$: C, 76.41; H, 9.86; N, 13.71; neutral equivalent (acetic acid/perchloric acid), 102.2. Found: C, 77.0, 76.96; H, 10.02, 10.03; N, 13.80, 13.77; neutral equivalent (acetic acid/perchloric acid) 102.6, 102.3.

The ultraviolet absorption spectrum of trans-4-(p-aminobenzyl)cyclohexylamine resembles that for aromatic amines in general, exhibiting a peak at 2900 angstrom units (specific absorption coefficient in 95% ethanol, 3.48).

The trans diamine was characterized by the following derivatives: picrate, M. P. 217° C. (dec.); diacetyl derivative (dimorphic), α-form, M. P. 209.5–211.4° C.; β-form, M. P. 224.2–225.3° C.

The mother liquor and washings from the first recrystallization of crude 4-(p-aminobenzyl)cyclohexylamine, described above, were concentrated on a steam bath under an atmosphere of nitrogen to a clear red syrup which crystallized on standing. The crystal cake was broken up (under nitrogen), transferred to the filter with a small quantity of benzene/petroleum ether (50–50 by volume), and dried in vacuo to yield 34 parts (16.6% yield) of crude cis-4-(p-aminobenzyl)cyclohexylamine melting at 70.2–75° C. On further concentration of the combined mother liquor and washings, there was obtained an additional quantity of very impure cis-4-(p-aminobenzyl)cyclohexylamine: 12.8 parts (2.5% yield); M. P. 55–64.5° C. The two fractions of cis isomer were combined and twice recrystallized from benzene/petroleum ether under an atmosphere of nitrogen to yield 76 parts of cis-4-(p-aminobenzyl)cyclohexylamine melting at 69–72° C.; this material was still contaminated by some of the trans isomer as evidenced by the wide melting point range.

One hundred parts of pure trans-4-(p-aminobenzyl)cyclohexylamine, prepared as described above, 104 parts of purified dioxane, and 3 parts of ruthenium dioxide were charged into a bomb mounted on a shaking device, the system purged several times with hydrogen, heated to 110° C. and pressured to 2–3000 lbs./sq. in. with hydrogen, and maintained under these conditions for three hours with shaking. The bomb was cooled, the contents discharged, the catalyst filtered off with the aid of activated carbon, and the product isolated by distillation. There was obtained 77.4 parts (75.2% yield) of bis(4-aminocyclohexyl)methane in the form of a colorless syrup which completely solidified on standing; B. P. 127.5° C./0.9 mm.–134° C./1.3 mm.; $n_D^{25}$, 1.5032; neutral equivalent, 104.8 (105.2 theory).

Conversion of the trans isomer, obtained as described above, to trans-1-amino-4-benzylcyclohexane and to trans-4-aminodicyclohexylmethane, which are of interest for further chemical transformations are described below:

To a cooled solution (1–6° C.) of 51.1 parts of trans-4-(p-aminobenzyl)cyclohexylamine in 396 parts of 25% hypophosphorous acid was added with stirring over a period of one hour a solution of 19.3 parts of sodium nitrite in 50 parts of water. After maintaining the solution at 2° C. with stirring for an additional 1.5 hours, excess nitrous acid was destroyed by addition of sulfamic acid, and a solution of 80 parts of sodium hydroxide in 150 parts of water was added, whereupon a solid and an oil separated. Ether was added, the solid removed by filtration, and the filtrate extracted with two portions (71 parts) of ether, the ether solution extracted with a solution of 99 parts of 12N. hydrochloric acid in 250 parts of water, the acid extract diluted to a volume of one liter, and the amine precipitated as an oil by addition of a solution of 80 parts of sodium hydroxide in 150 parts of water. The amine was freed from nonvolatile basic products by steam distillation, dissolved in benzene, extracted from the benzene solution with 150 parts of 3 N. hydrochloric acid, the amine liberated by addition of a solution of 40 parts of sodium hydroxide in 100 parts of water, dried, and distilled to yield 20.4 parts (43.3% yield) of trans-1-amino-4-benzylcyclohexane as a colorless liquid boiling at 105.2° C./1.2 mm.; $n_D^{25}$, 1.5326.

Anal. Calcd. for $C_{13}H_{25}N$: Neutral equivalent, 189.3. Found: Neutral equivalent, 188.9.

The amine was characterized by means of its acetyl derivative melting at 133.2–134.3° C., and by means of its picrate melting at 200–201° C.

A mixture of 25 parts of trans-1-amino-4-benzylcyclohexane, 129 parts of purified dioxane, and 1.25 parts of ruthenium dioxide catalyst was charged into a pressure vessel adapted for shaking and the mixture subjected to a temperature of 100° C. and a pressure of 2–2500 lbs./sq. in. for 2.5 hours. The pressure vessel was cooled, the product rinsed from the vessel with methanol, one part of Norit A added, the catalyst filtered off, and the product isolated by distillation to yield 22.1 parts (85.7% yield) of trans-4-aminodicyclohexylmethane as a colorless liquid boiling at 98° C./1.5 mm.; $n_D^{25}$, 1.4870.

Anal. Calcd. for $C_{13}H_{25}N$: Neutral equivalent, 195.3. Found: Neutral equivalent, 195.1.

The amine was characterized by its acetyl derivative, melting at 139–140.2° C., and its picrate, melting at 178.5–182° C.

The [(aminophenyl)alkyl] cyclohexylamines of this invention, in addition to their value in the manufacture of dyestuff intermediates illustrated by the conversions described above, are also useful as intermediates for pharmaceuticals, germicides, rubber chemicals, surface-active agents, polyamides, polyamide-polyesters, corrosion inhibitors, etc.

As many apparently widely different embodiments of this invention may be made without departing from the spirit and scope thereof, it is to be understood that I do not limit myself to the specific embodiments thereof except as defined in the appended claims.

I claim:
1. A 4-[(para-aminophenyl)alkyl]cyclohexylamine.
2. 4-(para-aminobenzyl)cyclohexylamine.

GERALD M. WHITMAN.

REFERENCES CITED

The following references are of record in the file of this patent:

UNITED STATES PATENTS

| Number | Name | Date |
|---|---|---|
| 1,661,293 | Kranz | Mar. 6, 1939 |

OTHER REFERENCES

Schopf et al., "Ann.," vol. 448, pages 1–18 (1926).